United States Patent [19]
Katayama et al.

[11] Patent Number: 5,243,269
[45] Date of Patent: Sep. 7, 1993

[54] BATTERY POWER SUPPLY SYSTEM

[75] Inventors: Kunihiro Katayama; Kenichi Kaki, both of Yokohama; Takashi Tsunehiro, Ebina, all of Japan

[73] Assignee: Hitachi, Ltd., Tokyo, Japan

[21] Appl. No.: 797,023

[22] Filed: Nov. 25, 1991

[30] Foreign Application Priority Data

Nov. 26, 1990 [JP] Japan ................. 2-317760

[51] Int. Cl.⁵ .................................. H02J 7/00
[52] U.S. Cl. .............................. 320/14; 307/66
[58] Field of Search ............... 320/5, 6, 8, 13, 14, 320/22, 23, 24; 307/64, 66, 46

[56] References Cited

U.S. PATENT DOCUMENTS

| | | | |
|---|---|---|---|
| 4,323,788 | 4/1982 | Smith | 307/66 |
| 4,673,826 | 6/1987 | Masson | 307/66 |
| 4,754,160 | 6/1988 | Ely | 307/64 |
| 4,885,521 | 12/1989 | Crampton | 320/14 |
| 5,177,425 | 1/1993 | Goto | 320/6 |

FOREIGN PATENT DOCUMENTS 6219911 1/1990 Japan .
6223045 1/1990 Japan .

Primary Examiner—Kristine L. Peckman
Attorney, Agent, or Firm—Antonelli, Terry, Stout & Kraus

[57] ABSTRACT

A battery power supply system for supplying DC electric power to a DC operated apparatus includes an AC/DC adapter for converting AC electric power into DC electric power, a plurality of batteries and a battery charger for charging the plurality of batteries. The battery power supply system includes a plurality of charge lines for connecting the battery charger to the plurality of batteries and a plurality of discharge lines connected to outputs of the plurality of batteries. Switches are provided in each of the plurality of charge lines and discharge lines.

5 Claims, 3 Drawing Sheets

BATTERY POWER SUPPLY SYSTEM

BACKGROUND OF THE INVENTION

The present invention relates to a battery power supply system (battery system) for supplying electric power to a battery operated apparatus.

Recently, there is increased demand for portable personal computers, which can be operated by a battery. The personal computer designed to set importance on small size and light weight thereof has low power consumption and can be operated by a single small battery, while the personal computer designed to set importance on performance thereof has large power consumption and must be operated by one large battery or two medium batteries. When two batteries are used, there is an advantage that one of the two batteries can be replaced while the personal computer is operated by the other battery. In the prior art in which the two batteries are used, as disclosed in Japanese Patent Unexamined Publication No. 2-23045, a wired-OR circuit configuration of diodes is used to supply electric power from a plurality of power supplies. FIG. 5 shows a circuit configuration described in the above-mentioned Publication No. 2-23045, in which numerals 31 and 32 denote power supplies, 33 a diode connected in a path for supplying electric power of the power supply 31, 34 diodes connected in a path for supplying electric power of the power supply 32, and 35 a load. The number of diodes is varied to produce different voltages so as not to supply electric power by both of the power supplies 31 and 32 simultaneously. When the number of power supplies is further increased, the number of diodes is further increased, so that output voltages of the power supplies necessarily differ from each other.

In the above-mentioned prior art, electric power of the battery is supplied through the diode, and power consumption and generation of heat by a voltage drop across the diode are not considered. The personal computer requiring large current has large power consumption by the voltage drop, which can not be neglected. Further, the above-mentioned prior art also did not consider the charging of a plurality of batteries, and the battery system thereof is incomplete.

SUMMARY OF THE INVENTION

It is an object of the present invention to construct a battery power supply system (battery system) which suppresses useless power consumption, takes out electric power from a plurality of batteries effectively, and considers charging of the plurality of batteries.

In order to achieve the above object, according to the present invention, a wired-OR configuration using diodes is not used and a battery to be used or charged is switched by a switch, so that power consumption at a junction of a plurality of batteries is suppressed. Further, charging can be made in consideration of charging specification of a battery. Specifically, charging is switched so that high-speed charging is applied if a battery is consumed excessively and trickle charging is applied if the battery is not consumed excessively, and a separate charging path and a separate discharging path are provided in order to achieve a system in which when a power supply in addition to a battery is provided a main body can be operated by the power supply and at the same time the battery is charged by the power supply.

In charging, a switch connected in the charging path of the battery to be charged is closed and other switches are all opened, so that the battery is disconnected from a personal computer of the main body while the battery is being charged. In discharging, a switch connected in the discharging path of the battery to be discharged is closed so that electric power is supplied from the battery. Thus, the switches are changed over for charging or discharging and a charging system is realized in which electric power of the battery is discharged without useless power consumption and charging is made easily.

According to the present invention, useless power consumption of a battery can be suppressed and the battery can be used effectively. Further, the battery can be charged effectively and securely in accordance with a charging specification of the battery, and the battery can be charged rapidly while a personal computer of a main body is operated. The number of batteries can be increased with the same configuration regardless of the number of batteries. There can be realized a switch having a contact which is not worn away by adoption of an MOSFET as a switch portion and which requires little operating power and possesses a high-speed switch characteristic, and performance of the battery system itself is improved.

The foregoing description has been made to the personal computer by way of example, while the present invention can be applied to a battery power supply system of other battery operated apparatuses having relatively large power consumption such as, for example, a word processor, a portable television and a portable measuring instrument and the same excellent effects as in the personal computer are obtained.

DESCRIPTION OF THE PREFERRED EMBODIMENT

Figure 1:
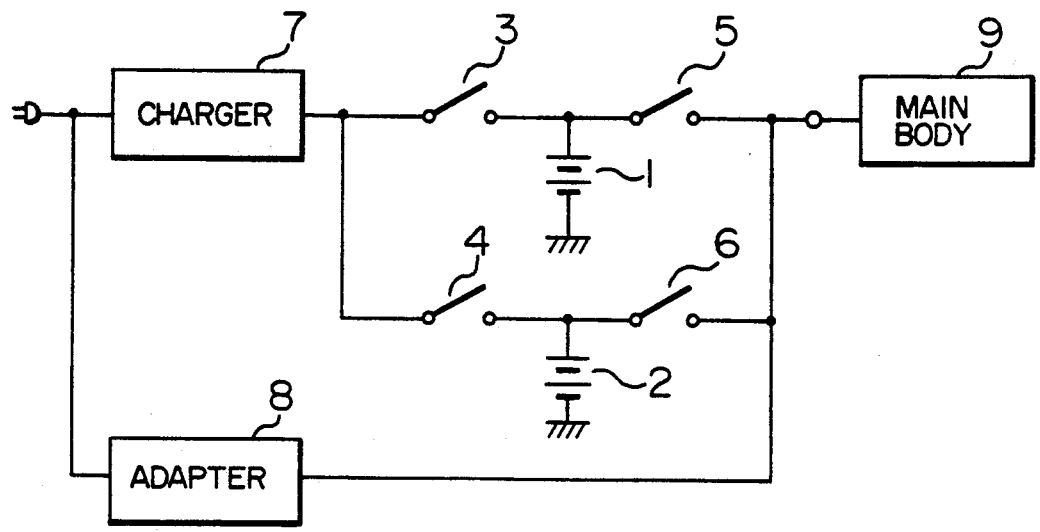
FIG. 1 is a block diagram of a battery power supply system according to the present invention.

An embodiment of the present invention is now described with reference to FIG. 1, which shows an example of a configuration of a battery power supply system (battery system) of the present invention. In FIG. 1, numerals 1 and 2 denote batteries, 3 and 4 switches connected in charging paths for the batteries 1 and 2, respectively, 5 and 6 switches connected in discharging paths for the batteries 1 and 2, respectively, 7 a battery charger coupled with an AC power supply for charging the battery with constant current control, 8 an AC power adapter coupled with the AC power supply for operating a personal computer of a main body with constant voltage control, and 9 the main body of a power operated apparatus which is a target of the battery power supply system. In the embodiment, description is made with respect to a personal computer by way of example. The operation of the embodiment is now described. When the AC power supply is coupled to the embodiment of FIG. 1; and operation of the main body 9 by the AC power supply is possible, electric power is supplied to the main body by means of the adapter 8. At this time, an output current of the charger 7 is switched in accordance with consumption degree of the batteries 1 and 2 and whether the switch 3 or 4 for the battery to be charged is closed. More particularly, if it is determined that the battery 1 is consumed excessively and is required to be charged rapidly when the battery 1 is to be charged, the charger 7 flows a large current for rapid charging and the switch 3 is closed to charge the battery 1 rapidly. Further, if the consumption of the battery 2 is small when the battery 2 is to be charged, the charger 7 flows a small current for trickle charging and the switch 4 is closed to trickle charge the battery 2. With the above circuit configuration, complicated control can be performed by opening and closing of the appropriate switch and the battery can be charged rapidly while operating the personal computer of the main body. Even if the number of batteries is increased, the basic configuration is not changed although the discharging paths are increased.

Figure 2:
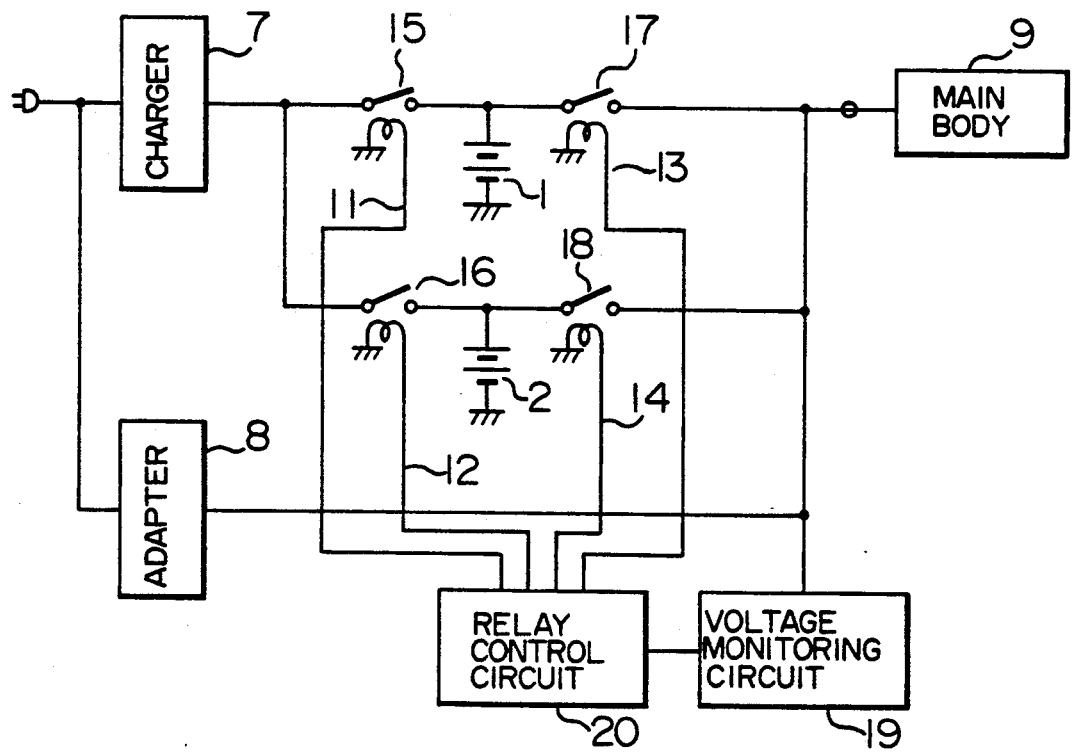
FIG. 2 is a block diagram for materializing control of the battery power supply system of the present invention.

The control method of the switches is now described with reference to FIG. 2. In FIG. 2, numerals 11, 12, 13 and 14 denote control signals for controlling the switches, 15, 16, 17 and 18 relays which are opened and closed in response to the control signals 11, 12, 13 and 14, 19 a voltage monitoring circuit for monitoring a voltage of the power supply for operating the main body 9, and 20 a relay control circuit for producing the control signals 11, 12, 13 and 14 in response to a detection signal of the voltage detection circuit 19. Operation of the circuit shown in FIG. 2 is now described. When the AC power supply is not coupled to the embodiment of FIG. 2 and the main body is operated by the battery, the relay 17 is closed and electric power is supplied to the main body by the battery 1. At this time, the voltage monitoring circuit 19 monitors the output voltage of the battery 1 to judge whether the voltage sufficient to drive the main body is produced from the battery or not. If the sufficient voltage is not produced, the relay 17 is opened and the relay 18 is closed to switch the battery so that electric power is supplied to the main body from the battery 2. When the AC power supply is coupled so that the AC power supply begins to supply electric power and the adapter 8 is supplied with electric power from the AC power supply so that the adapter 8 can operate the main body, the voltage monitoring circuit 19 detects it to transmit it to the relay control circuit 20, so that the relays 17 and 18 are opened to stop supply of electric power by the battery. At the same time, in order to rapidly charge the battery which is determined to be consumed extremely, in this case the battery 1, the relay 15 is closed to perform rapid charging for the battery 1. At this time, the relays 17 and 18 are closed, the current produced from the adapter 8 flows into the batteries which is not desirable for the batteries. Further, it is also not desirable that the relays 15 and 16 are both closed and both of the batteries 1 and 2 are charged simultaneously since it is impossible to charge the batteries with the constant current control. That is, in the present invention, the relay 15, 16, 17 or 18 is always closed exclusively and there is no case where two relays are closed simultaneously. An embodiment of a control circuit for realizing this operation is now described with reference to FIG. 3.

Figure 3:
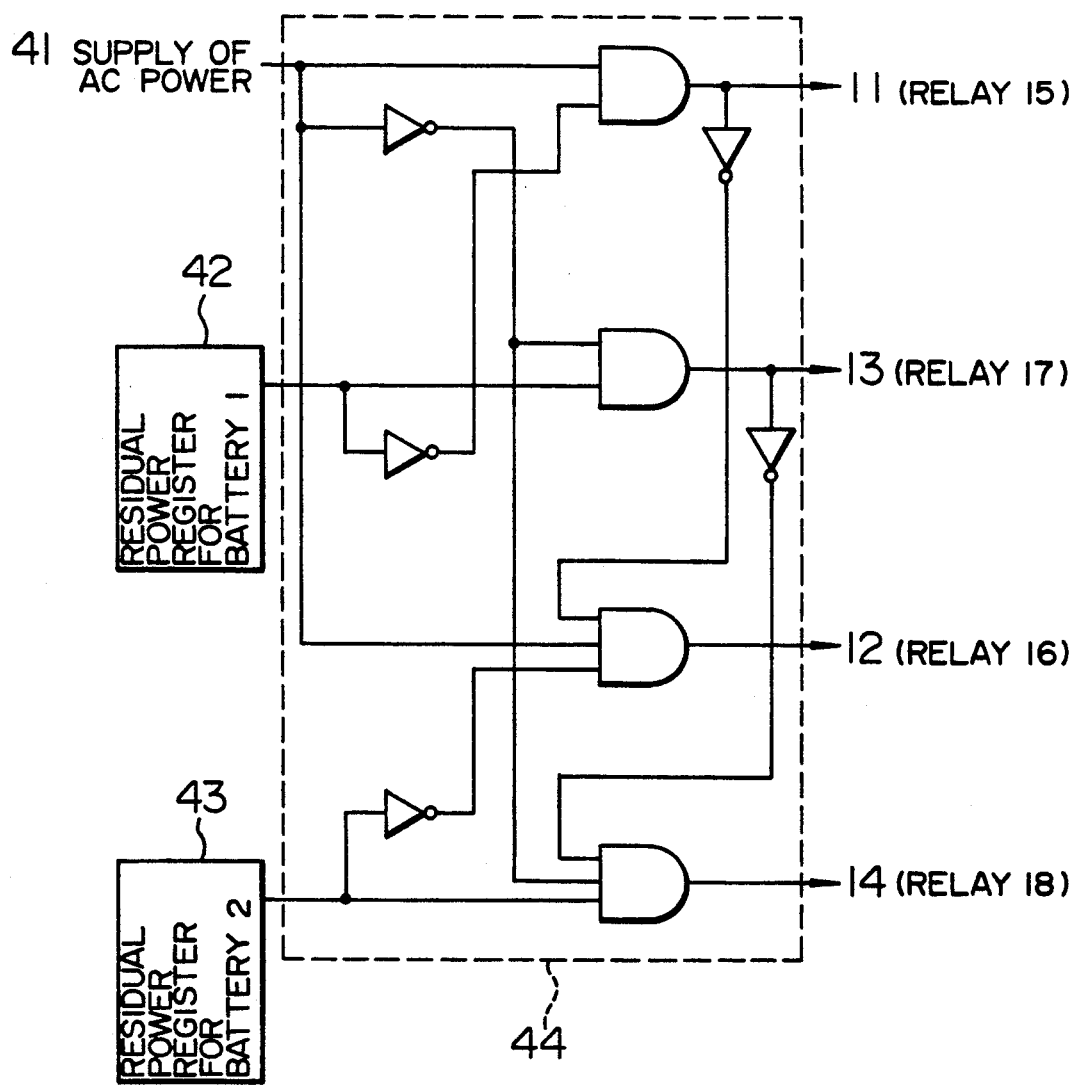
FIG. 3 is a control circuit diagram for materializing exclusive control of the present invention.

In FIG. 3, numeral 41 denotes a signal representing whether the AC power supply is coupled or not, 42 a register for storing information as to whether electric power remains in the battery 1 or not, 43 a register for storing information as to whether electric power remains in the battery 2 or not, and 44 a logic circuit for producing control signals on the basis of the signal 41 and information supplied from the registers 42 and 43. Whether the relay 15 or 16 is closed or the relay 17 or 18 is closed is determined on the basis of the signal 41 representing whether the AC power supply is coupled or not and then one of the relays to be closed is determined on the basis of the information of the register 42 or 43. According to the above operation, the four relays are operated exclusively to achieve the objective. The performance of the batteries is not deteriorated and the batteries are continuously used effectively.

Figure 4:
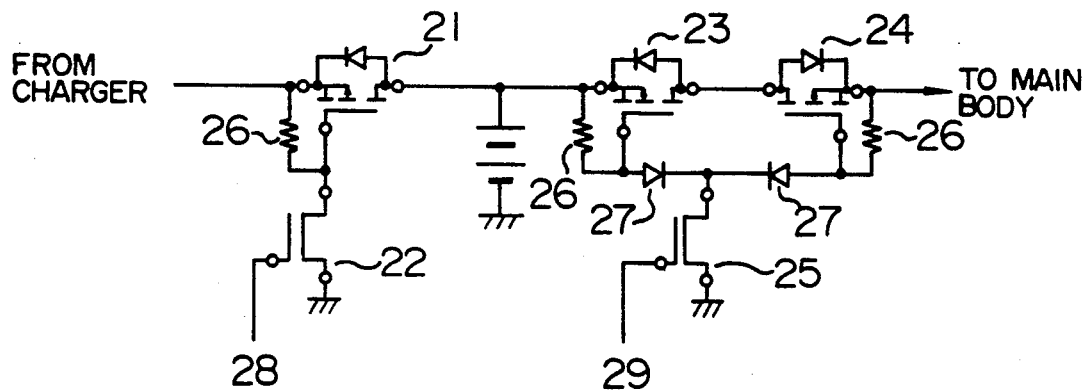
FIG. 4 is a circuit diagram of a switch portion of the battery power supply system of the present invention, the switch portion being configured by power MOSFETs.
Figure 5:
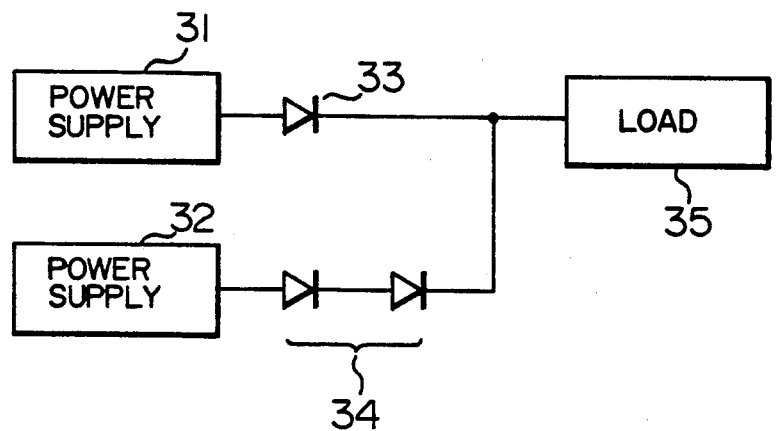
FIG. 5 is a block diagram of a conventional power supply system.

Another embodiment of the switch portion is now described. FIG. 4 is a circuit diagram showing a switch portion of FIG. 1 which is constituted of power MOSFETs. In FIG. 4, numeral 21 denotes a P-channel MOSFET which functions as the switch connected in the charging path, 22 an N-channel MOSFET for controlling the FET 21, 23 and 24 P-channel MOSFETs which function as the switches connected in the discharging path, 25 an N-channel MOSFET for controlling the FETs 23 and 24, 26 a resistor for driving the P-channel MOSFETs 21, 23 and 24, 27 a diode for separating the FETs 23 and 24, 28 a control signal for closing the FET 21, and 29 a control signal for closing the FETs 23 and 24. The circuit configuration of the charging path is different from that of the discharging path because the discharging path must prevent a current flow into the battery through the discharging path since a voltage of the battery is lower than that of the AC power supply when the voltage of the AC power supply is supplied to the main body to operate the main body, whereas a current flows through the charging path only unidirectionally. Further, the power MOSFET has a parasitic diode and a forward current flows from the drain to the source of the power MOSFET. Accordingly, as shown in FIG. 4, two FETs are connected in series to be operated as bi-directional switch. When a control signal is active, the FET 25 is turned on to reduce a gate potential of the FETs 23 and 24, so that the FETs 23 and 24 are turned on. When the control signal 29 is inactive, the gate potential of the FETs 23 and 24 is increased to turn off the FETs 23 and 24, so that voltage supply to the main body from the battery is stopped. A current in the backward direction is prevented by the parasitic diode of the FET 24. On the other hand, the path from the charger to the battery is controlled by opening and closing the FET 21 by the potential of the control signal 28. It is not necessary to consider a current in the reverse direction. If necessary, a diode may be connected in the forward direction. As described above, by constituting the switches with the power MOSFETs, high-speed switching characteristic, low-power operation and high durability are attained. An on-resistance of the FET is 100 mΩ or less in the present state and uselessness of electric power is small as compared with a diode.

We claim:
1. A battery power supply system comprising:
an input terminal for receiving AC electric power;
an output terminal for supplying DC electric power to a DC operated apparatus;

an AC/DC adapter for receiving the AC electric power from said input terminal, converting the AC electric power into the DC electric power and supplying the DC electric power to said output terminal;

a plurality of batteries for supplying the DC electric power to said output terminal;

a battery charger for charging said batteries by the AC electric power received from said input terminal;

a plurality of charge lines for connecting said battery charger to said plurality of batteries individually;

a plurality of discharge lines for connecting said plurality of batteries to said output terminal individually; and switches provided in each of said plurality of charge lines and said plurality of discharge lines wherein said switches are operated by exclusive logic control to turn on only one of said switches.

2. A battery power supply system comprising:

an input terminal for receiving AC electric power;

an output terminal for supplying DC electric power to a DC operated apparatus;

an AC/DC adapter for receiving the AC electric power from said input terminal, converting the AC electric power into the DC electric power and supplying the DC electric power to said output terminal;

a plurality of batteries for supplying the DC electric power to said output terminal;

a battery charger for charging said batteries by the AC electric power received from said input terminal;

a plurality of charge lines for connecting said battery charger to said plurality of batteries individually;

a plurality of discharge lines for connecting said plurality of batteries to said output terminal individually; and switches provided in each of said plurality of charge lines and said plurality of discharge lines, wherein said switches comprise power MOSFETs.

3. A battery power supply system according to claim 2, wherein said switches provided in said discharge lines comprise two P-channel MOSFETs having drains connected in series to each other.

4. A battery power supply system comprising:

an input terminal for receiving AC electric power;

an output terminal for supplying DC electric power to a DC operated apparatus;

an AC/DC adapter for receiving the AC electric power from said input terminal, converting the AC electric power into the DC electric power and supplying the DC electric power to said output terminal;

a plurality of batteries for supplying the DC electric power to said output terminal;

a battery charger for charging said batteries by the AC electric power received from said input terminal;

a plurality of charge lines for connecting said battery charger to said plurality of batteries individually;

a plurality of discharge lines for connecting said plurality of batteries to said output terminal individually; and switches provided in each of said plurality of charge lines and said plurality of discharge lines, wherein said switches provided in each of said plurality of charge lines are controlled to be turned on and off.

5. A battery power supply system according to claim 4, wherein said switches are controlled to be turned on and off by a control signal determined by a battery condition.

* * * * *